United States Patent Office 2,729,669
Patented Jan. 3, 1956

2,729,669

CYANOACYLALKENYLUREAS

Viktor Papesch, Morton Grove, and Elmer F. Schroeder, Chicago, Ill., assignors to G. D. Searle & Co., Chicago, Ill., a corporation of Illinois No Drawing. Application October 31, 1951, Serial No. 254,196

7 Claims. (Cl. 260—465.4)

The present invention is concerned with a new group of organic nitriles and, more particularly, with the compounds of the general structural formula

R—NH—CO—NR'—CO—A—CN wherein A is a lower alkylene radical and one of the radicals R and R' is a member of the class consisting of lower alkyl, lower hydroxyalkyl, lower aralkyl, and lower aryl radicals, and the other is a lower alkenyl radical.

The radical A is a lower, saturated, bivalent, aliphatic hydrocarbon radical such as methylene, ethylene, propylene, butylene, trimethylene, and tetramethylene.

Among the radicals which one of the substituents R and R' may represent are lower alkyl radicals such as methyl, ethyl, normal and branch-chained propyl, butyl, amyl, and hexyl, lower cycloalkyl radicals as cyclopropyl, cyclobutyl, cyclopentyl, and cyclohexyl, lower aryl radicals such as phenyl, tolyl, and naphthyl, lower aralkyl radicals as benzyl, phenethyl, and phenylpropyl, and lower hydroxyalkyl radicals as hydroxyethyl, hydroxypropyl, hydroxybutyl, and the like.

The other one of the radicals R and R' is a lower alkenyl radical such as 2-propenyl, 2-butenyl, 2-pentenyl, 3-pentenyl, and hexenyl as well as an alkyl substituted derivative thereof such as methallyl, ethallyl, methylcrotyl and the like.

The nitriles of this invention have been found to possess valuable therapeutic properties, particularly because of their effect on the cardiovascular and renal systems and their chemotherapeutic action. Further they are valuable intermediates for the production of other medicinal agents such as uracils, xanthines and the like, as shown in our copending applications, Serial No. 198,028, filed November 28, 1950, now abandoned, of which the present application is a continuation-in-part, and Serial No. 264,248, filed December 29, 1951, issued as U. S. Patent 2,650,922 on September 1, 1953.

The compounds of our invention may be prepared by a number of methods. One of the preferred procedures consists in the heating of a urea of the type

R—NH—CO—NH—R' with acetic anhydride and a cyanoalkanoic acid of the type

NC—A—COOH for 30 to 200 minutes at 50–100° C. It has been found that the substitution of this cyanoacyl group occurs primarily at the nitrogen atom to which the smaller group is attached. Thus if R is a radical containing more carbon atoms than R', the substitution occurs primarily as follows:

R—NH—CO—NH—R'+NC—A—COOH→
       R—NH—CO—NR'—CO—A—CN+H₂O

If the R and R' groups are of similar size, both of the expected isomers will be obtained in considerable amounts.

We have also developed new methods for preparing these compounds, wherein substituted cyanoacylamines of the type

R'—NH—CO—A—CN are condensed with isocyanates of the type

R—N=C=O all symbols being defined as hereinabove. It will be apparent that in this case it is immaterial whether the R group is larger or smaller than the R' group. However, the yields obtained by this method are not as good as those obtained with the method mentioned above. It may be an advantage of this method that no mixtures are obtained. However, because of the similarity in activity usually observed with the two isomers, we have found it practical to use the mixture obtained by the first method above in medicinal evaluations and in the synthesis of uracils.

On evaporation of the solvents used for the condensation under reduced pressure, the cyanoacylureas were usually obtained as syrups, but in several cases they crystallized readily. The syrups may be further purified by high vacuum distillation.

In order to establish their structure the compounds derived from α-cyanoalkanoic acids were converted to the corresponding 6-amino-1,2,3,4-tetrahydro-2,4-pyrimidinediones. This cyclization is effected by heating with a dilute alkali solution. The position of the groups R and R' in the substituted pyrimidinediones was verified by alkylation of the 1-monosubstituted uracils, the latter being derived from the monosubstituted cyanoacylureas of the type

R—NH—CO—NH—CO—CH₂—CN

The following examples illustrate in detail certain of the compounds which comprise this invention and the methods for producing them. The invention is not to be construed as limited thereby in spirit or in scope. It will be apparent to chemists skilled in the art that many modifications in materials and methods can be made without departing from our invention. In this application temperatures are given uncorrected in degrees centigrade (° C.), quantities of materials in parts by weight, and pressures during vacuum distillation in millimeters (mm.) of mercury.

*Example 1*

To a solution of 85 parts of mono-allylurea in 105 parts of acetic anhydride, 85 parts of cyanoacetic acid are added and the mixture is maintained at 65° C. for 2.5 hours. The mixture is then distilled at 20 mm. pressure until a syrup remains. 50 parts of water are added to this syrup and distillation is resumed. The resulting syrup is dissolved in 3 parts of 96% ethanol at 60° C., stirred with charcoal and filtered. 5 to 6 volumes of ether are added to the filtrate at 40° C. Upon cooling the N-cyanoacetyl-N'-allylurea precipitates. It is collected on a filter and washed with ether. The white crystals melt at about 142–144° C.

The N-cyanoacetyl-N'-allylurea is cyclized by dissolving in warm 10% sodium hydroxide solution and treating with a sufficient amount of 70% sodium hydroxide to raise the pH to 10. The solution is maintained at 60° C. for five minutes. After cooling the crystals are collected on a filter and recrystallized from water. 1-allyl-6-amino-1,2,3,4-tetrahydro-2,4-pyrimidinedione is obtained in the form of white crystals melting at 270–272° C. The 3-allylxanthine prepared from this pyrimidinedione melts at about 300–301.5° C.

*Example 2*

300 parts of the ethyl ester of cyanoacetic acid and 150 parts of allylamine are mixed and maintained for one hour at 55° C. The mixture is then cooled and the precipitate is filtered, washed with petroleum ether, and then with diethyl ether. The resulting N-allyl-cyanoacetamide, recrystallized from toluene, melts at about 63–66° C.

400 parts of this amide and 460 parts of ethyl isocyanate in 3600 parts of toluene are heated at reflux temperature for 24 hours with stirring. After cooling and standing the solution is seeded with N-allylcyanoacetamide and the unreacted material is caused to precipitate. The filtrate is evaporated at 50° C. in vacuo to a syrup which crystallizes upon standing at 0° C. Recrystallized from water, using charcoal as a clarifying agent, the white N-allyl-N-cyanoacetyl-N′-ethylurea melts at about 84–86° C.

In order to induce cyclization a sufficient amount of 10% sodium hydroxide is added to raise the pH to 10. Cyclization occurs with great violence. After cooling, the 1-ethyl-3-allyl-6-amino-1,2,3,4-tetrahydro-2,4-pyrimidinedione is filtered, washed with ice water and recrystallized from water, using charcoal as a decolorizing agent. After dehydration this compound melts at about 142–144° C. although some sintering is observed at 132–134° C.

*Example 3*

300 parts of N-ethyl-N′-allylurea are dissolved in 650 parts of acetic anhydride and 630 parts of glacial acetic acid. Then 190 parts of cyanoacetic acid are added and the mixture is maintained at 65° C. for 2 hours. Most of the solvent is distilled off at 20 mm. pressure and 60° C. 100 parts of water are added to the syrup and the distillation is resumed. The remaining syrup consists principally of N-cyanoacetyl-N-ethyl-N′-allylurea and a smaller amount of N-cyanoacetyl-N-allyl-N′-ethylurea.

In order to effect ring closure 50 parts of this syrup are dissolved in 50 parts of 10% sodium hydroxide and the pH is adjusted to 10 by addition of 70% sodium hydroxide. The mixture is maintained at 60° C. for 5 minutes. On cooling crystals separate which are collected on a filter. These crystals, which contain about 80% 1-allyl-3-ethyl-6-amino-1,2,3,4 - tetrahydro-2,4 - pyrimidinedione and 20% 1-ethyl-3-allyl-6-amino-1,2,3,4-tetrahydro-2,4-pyrimidinedione, melt after dehydration at about 132–133° C. The ethyl allyl xanthine derivative prepared therefrom melts at about 182–185° C.

*Example 4*

185 parts of isobutylamine are dissolved in 900 parts of benzene and cooled in an ice bath while 200 parts of allyl isocyanate are added gradually. The temperature should not be permitted to rise above 30° C. The benzene is removed by vacuum distillation and the N-allyl-N′-isobutylurea crystallizes spontaneously. 38 parts of this urea derivative are dissolved in 100 parts of acetic anhydride. To this solution 27 parts of cyanoacetic acid are added and the temperature is maintained at 55–60° C. for 2 hours. The solvent is removed as completely as practical by vacuum distillation at 20 mm. pressure and 60° C., after which 75 parts of water are added and the solution is redistilled under the same conditions until a syrup remains which contains a mixture of N-cyanoacetyl-N-isobutyl-N′-allylurea and N-cyanoacetyl-N-allyl-N′-isobutylurea.

In order to effect ring closure, this syrupy mixture is dissolved in an equal volume of 10% sodium hydroxide and the pH is adjusted to 10 by addition of 70% sodium hydroxide. The mixture is maintained at 70° C. for 5 minutes and upon cooling crystals separate. These crystals are recrystallized twice from 40–45% ethanol. The resulting white product consists of the hydrates of 1 - allyl - 3 - isobutyl - 6 - amino - 1,2,3,4 - tetrahydro-2,4-pyrimidinedione and of 1-isobutyl-3-allyl-6-amino-1,2,3,4-tetrahydro-2,4-pyrimidinedione. The dehydrated mixture melts at about 92–97° C.

*Example 5*

30 parts of n-hexylamine in 70 parts of benzene are maintained at about 20° C. while 25 parts of allyl isocyanate are slowly added. The product is evaporated in vacuo whereupon the N-hexyl-N′-allylurea crystallizes in long needles. The urea derivative thus obtained is reacted with 30 parts of cyanoacetic acid and 100 parts of acetic anhydride for two hours at 60° C. The solvent is removed by vacuum distillation at 20 mm. and 60° C. as far as practical. The syrup is diluted with water and vacuum distillation resumed. This process is repeated and a thick syrup is obtained which consists of N-allyl-N-cyanoacetyl-N′-hexylurea and a small but significant amount of N-hexyl-N-cyanoacetyl-N′-allylurea.

This syrup is treated with 10% sodium hydroxide so as to raise the pH above 10 at a temperature of about 70° C. The mixture consisting primarily of 1-hexyl-3-allyl-6-amino-1,2,3,4-tetrahydro-2,4-pyrimidinedione and a smaller amount of 1-allyl-3-hexyl-6-amino-1,2,3,4-tetrahydro-2,4-pyrimidinedione does not crystallize spontaneously. The 5-nitroso derivative thereof is prepared by nitrosating in alcohol with sodium nitrite and acetic acid. The nitroso derivative, recrystallized from 50% alcohol, melts at about 140–145° C.

*Example 6*

20 parts of phenyl isocyanate are added dropwise with stirring to a solution of 10 parts of allylamine in 50 parts of benzene, the reaction mixture being maintained at a temperature below 25° C. Evaporation in vacuo yields the N-allyl-N′-phenylurea. The compound thus obtained is treated with 19 parts of cyanoacetic acid and 60 parts of acetic anhydride for two hours at 60° C. Vacuum distillation at 20 mm. and 60° C. and crystallization yields a mixture consisting primarily of N-allyl-N-cyanoacetyl-N′-phenylurea and a smaller amount of N-phenyl N-cyanoacetyl-N′-allylurea. This mixture, recrystallized from alcohol, melts at about 114–115° C.

In order to effect ring closure these crystals are treated with 10% sodium hydroxide solution to raise the pH to 10. After heating at 75° C. for 5 minutes, the mixture is cooled and the precipitate collected on a filter. Two successive recrystallizations from 50% alcohol yield white crystals melting at about 190–194° C. These crystals consist primarily of 1-phenyl-3-allyl-6-amino-1,2,3,4-tetrahydro-2,4-pyrimidinedione but contain an admixture of 1-allyl-3-phenyl-6-amino-1,2,3,4-tetrahydro-2,4-pyrimidinedione.

*Example 7*

To a solution of 30 parts of benzylamine in 70 parts of benzene maintained at a temperature below 25° C., 25 parts of allyl isocyanate are slowly added with stirring. The solvent is removed under vacuum. To the N-allyl-N′-benzylurea thus obtained, 30 parts of cyanoacetic acid and 100 parts of acetic anhydride are added and the solution is heated at 60° C. for 2 hours. Vacuum distillation results in the formation of a syrup. After addition of 50 parts of water, vacuum distillation is resumed and this process is repeated once more. The syrup thus obtained contains a mixture of N-allyl-N-cyanoacetyl-N′-benzylurea and N-benzyl-N-cyanoacetyl-N′-allylurea.

In order to effect cyclization the pH is raised to 10 by addition of a 10% solution of sodium hydroxide. The temperature is raised to 70° C. After 5 minutes the solution is cooled and the gummy precipitate is filtered. On treatment with 50% ethanol the precipitate crystallizes and recrystallization from 75% alcohol yields white crystals which melt at about 218–220° C. They consist primarily of 1-benzyl-3-allyl-6-amino-1,2,3,4-tetrahydro-2,4-pyrimidinedione, but contain an admixture of 1-allyl-3 - benzyl - 6 - amino - 1,2,3,4 - tetrahydro - 2,4-pyrimidinedione.

*Example 8*

To a chilled solution of 184 parts of crotyl isocyanate in 700 parts of benzene, 122 parts of β-aminoethanol are added gradually with stirring, the temperature being maintained below 25° C. The solvent is removed under vacuum. 240 parts of the N-(β-hydroxyethyl)-N'-crotylurea thus obtained are reacted with 210 parts of cyanoacetic acid and 700 parts of acetic anhydride for 2 hours at 60° C. The solvent is evaporated in vacuo at 60° C. as far as practical. The residual syrup is diluted with an equal volume of water and vacuum distillation is resumed. After repetition of this dilution and evaporation process, a syrupy mixture is obtained.

In order to effect cyclization this mixture is treated with a sufficient amount of 10% potassium hydroxide to raise the pH to 10. The alkali is added portionwise to prevent a rise in temperature above 70° C. Cyclization at 60–70° C. is completed within a few minutes. Upon concentration and chilling, there precipitates a mixture of the isomers, in which the 1-crotyl-3-(β-hydroxyethyl) - 6 - amino - 1,2,3,4 - tetrahydro - 2,4-pyrimidinedione predominates over the 1-(β-hydroxyethyl) - 3 - crotyl - 6 - amino - 1,2,3,4 - tetrahydro - 2,4-pyrimidinedione.

Example 9

194 parts of methallylurea are dissolved in 260 parts of acetic anhydride and treated with 170 parts of cyanoacetic acid. After heating and stirring at 70–75° C. for one half hour or until crystallization occurs, 800 parts of hot water are added. Upon cooling precipitation occurs. The N-cyanoacetyl-N'-methallylurea thus obtained melts at about 143–145° C. after another recrystallization from water. Cyclization is effected by dissolving in 400 parts of 5% sodium hydroxide solution and treating with a sufficient amount of 70% sodium hydroxide to raise the pH to about 10. After heating for one half hour at 75° C. the pH is lowered by addition of dilute hydrochloric acid to about 4, and the 1-methallyl-6-amino-1,2,3,4-tetrahydro-2,4-pydimidinedione collected on a filter and recrystallized from dilute ethanol, using charcoal as a clarifying agent. The resulting pure crystals melt at about 266–268° C.

Example 10

To a cooled and stirred solution of 142 parts of methallylamine in 900 parts of benzene, 156 parts of ethyl isocyanate are added dropwise. Upon concentration in vacuum N-ethyl-N'-methallylurea is obtained.

260 parts of this urea derivative are dissolved in 500 parts of acetic anhydride and treated with 157 parts of cyanoacetic acid at 60° C. and heated at that temperature for 2 hours. The solution is then concentrated in vacuum to a syrup. 100 parts of water are added and the vacuum distillation is repeated. The remaining syrup contains a mixture of N-cyanoacetyl-N-ethyl-N'-methallylurea and a small quantity of N-cyanoacetyl-N-methallyl-N'-ethylurea.

This syrup is treated with sufficient 20% sodium hydroxide solution to raise the pH to 10. A violent reaction occurs. The reaction mixture is diluted with 50 parts of water, stirred, cooled and filtered. The material collected on the filter is recrystallized from 10% ethanol to yield a mixture of 1-methallyl-3-ethyl-6-amino-1,2,3,4-tetrahydro-2,4-pyrimidinedione and 1-ethyl-3 - methallyl-6-amino-1,2,3,4-tetrahydro-2,4-pyrimidinedione melting at about 157–159° C.

Example 11

340 parts of the ethyl ester of β-cyanopropionic acid and 150 parts of allylamine are mixed and maintained for 1 hour at 55° C. The mixture is then cooled and the precipitate is filtered and washed first with petroleum ether and then with diethyl ether. 132 parts of the resulting N-allyl-β-cyanopropionamide and 135 parts of ethyl isocyanate in 800 parts of toluene are heated at reflux temperature for 24 hours with stirring. After cooling and standing the unreacted mixture is seeded with N-allyl-β-cyanopropionamide to precipitate the unreacted amide. The filtrate is evaporated to a syrup which contains the N-allyl-N-β-cyanopropionyl-N'-ethylurea of the structural formula $$CH_2=CH-CH_2-N-CO-CH_2-CH_2-CN$$
$$\phantom{CH_2=CH-CH_2-N-}|$$
$$\phantom{CH_2=CH-CH_2-N-}CO-NH-C_2H_5$$

Since the nitrile group is removed by two carbon atoms from the next carbonyl group, it is obviously impossible to cyclize this urea to a pyrimidine.

Example 12

A solution of 38 parts of N-allyl-N'-isobutylurea in 110 parts of acetic anhydride is treated with 27 parts of α-cyanopropionic acid and the temperature is maintained at 60° C. for 2 hours. The solvent is removed as completely as practicable at 20 mm. pressure after which 200 parts of water are added and the solution is redistilled in vacuo until a syrup remains which contains a mixture of N-(α-cyanopropionyl)-N-allyl-N'-isobutylurea and the N-(α-cyanopropionyl)-N-isobutyl-N'-allylurea.

This syrup is dissolved in an equal volume of a 10% sodium hydroxide solution and the pH is raised to 10 by addition of 70% sodium hydroxide. The mixture is maintained at 75° C. for 5 minutes, then cooled to yield 1-isobutyl-3-allyl-5-methyl-6-amino-1,2,3,4-tetrahydro-2,4-pyrimidinedione and 1-allyl-3-isobutyl-5-methyl-6-amino-1,2,3,4-tetrahydro-2,4-pyrimidinedione. After two recrystallizations from 50% ethanol using charcoal as a clarifying agent, white crystals melting at about 92–97° C. are obtained.

We claim:
1. A nitrile of the structural formula

R—NH—CO—NR'—CO—A—CN wherein A is a lower alkylene radical, and one of the radicals R and R' is a lower alkyl radical containing less than 4 carbon atoms and the other a lower alkenyl radical containing more than 2 and less than 5 carbon atoms.

2. A nitrile of the structural formula

R—NH—CO—NR'—CO—CH$_2$—CN wherein R is a methallyl radical, and R' is a lower alkyl radical containing less than 4 carbon atoms.

3. A nitrile of the structural formula

CH$_2$=CH—CH$_2$—NH—CO—NR'—CO—CH$_2$—CN wherein R' is a lower alkyl radical containing less than 4 carbon atoms.

4. N-ethyl-N-cyanoacetyl-N'-allylurea.
5. A nitrile of the structural formula

R—NH—CO—NR'—CO—CH$_2$—CN wherein R is a lower alkyl radical containing less than 4 carbon atoms, and R' is a methallyl radical.

6. A nitrile of the structural formula

R—NH—CO—N(—CH$_2$—CH=CH$_2$)—CO—CH$_2$—CN wherein R is a lower alkyl radical containing less than 4 carbon atoms.

7. N-allyl-N-cyanoacetyl-N'-ethylurea.

References Cited in the file of this patent
UNITED STATES PATENTS

| | | |
|---|---|---|
| 2,313,498 | Allen et al. | Mar. 9, 1943 |
| 2,553,022 | Wallingford et al. | May 15, 1951 |
| 2,598,936 | Papesch et al. | June 3, 1952 |